(12) United States Patent
Toba (10) Patent No.: US 8,395,518 B2
(45) Date of Patent: Mar. 12, 2013

(54) MOBILE TERMINAL, CONTROL METHOD, PROGRAM AND RECORDING MEDIUM

(75) Inventor: Hiroyuki Toba, Tokyo (JP)

(73) Assignee: NEC Corporation, Tokyo (JP)

( * ) Notice: Subject to any disclaimer, the term of this patent is extended or adjusted under 35 U.S.C. 154(b) by 162 days.

(21) Appl. No.: 12/678,335

(22) PCT Filed: Oct. 20, 2008

(86) PCT No.: PCT/JP2008/068958
§ 371 (c)(1),
(2), (4) Date: Mar. 16, 2010

(87) PCT Pub. No.: WO2009/066526
PCT Pub. Date: May 28, 2009

(65) Prior Publication Data
US 2010/0259400 A1 Oct. 14, 2010

(30) Foreign Application Priority Data
Nov. 20, 2007 (JP) ................................. 2007-300422

(51) Int. Cl.
*G08B 21/00* (2006.01)
(52) U.S. Cl. .................. 340/636.1; 340/455; 340/693.2; 307/10.7; 307/115; 307/130; 307/65; 320/136; 455/573; 455/343.5
(58) Field of Classification Search ............... 340/636.1; 455/573
See application file for complete search history.

(56) References Cited

U.S. PATENT DOCUMENTS 5,691,742 A * 11/1997 O'Connor et al. ............ 715/835
5,862,394 A * 1/1999 Watts et al. .................... 713/330
6,463,305 B1 * 10/2002 Crane ........................... 455/566
7,107,472 B2 * 9/2006 Weinold ....................... 713/324
7,386,403 B2 * 6/2008 Chen et al. ..................... 702/63
7,460,891 B2 * 12/2008 Koch et al. .................... 455/574
7,580,695 B2 * 8/2009 Sabram ..................... 455/343.1
7,728,552 B2 * 6/2010 Burns .......................... 320/116
7,761,120 B2 * 7/2010 Tsuchi et al. ................. 455/566
2002/0082059 A1 * 6/2002 Nariai et al. .................. 455/573
2003/0227390 A1 * 12/2003 Hung et al. ................ 340/636.1
2004/0029546 A1 * 2/2004 Tsuchi et al. ............... 455/159.1
2004/0268159 A1 * 12/2004 Aasheim et al. ............. 713/300
2005/0062612 A1 * 3/2005 Smith et al. ............... 340/636.1

(Continued)

FOREIGN PATENT DOCUMENTS

JP 5-244733 A 9/1993
JP H08069347 A 3/1996

(Continued)

OTHER PUBLICATIONS

International Search Report for PCT/JP2008/068958 mailed Dec. 9, 2008.

(Continued)

*Primary Examiner* — Benjamin C Lee
*Assistant Examiner* — Quang D Pham (57) ABSTRACT

A mobile terminal, a control method, a program and a recording medium which can advise the user about a charge or a change to a charged battery is provided. There are provided: a control means for erasing a screen of a display device automatically and showing a reason of the erasing and/or a coping process to a user; and a detection means for detecting a battery exchange or attachment/detachment of an external power supply.

17 Claims, 7 Drawing Sheets

U.S. PATENT DOCUMENTS

| | | | |
|---|---|---|---|
| 2005/0162017 A1* | 7/2005 | Chin et al. | 307/44 |
| 2005/0200593 A1* | 9/2005 | Willemin et al. | 345/156 |
| 2005/0255893 A1* | 11/2005 | Jin et al. | 455/572 |
| 2006/0072268 A1* | 4/2006 | Kang | 361/92 |
| 2006/0087289 A1* | 4/2006 | Chen | 320/128 |
| 2006/0229832 A1* | 10/2006 | Chen et al. | 702/63 |
| 2006/0236144 A1* | 10/2006 | Chao | 713/323 |
| 2006/0255958 A1* | 11/2006 | Jiang et al. | 340/636.1 |
| 2006/0264197 A1* | 11/2006 | Mahini et al. | 455/343.5 |
| 2007/0121536 A1* | 5/2007 | Aihara | 370/318 |
| 2010/0184382 A1* | 7/2010 | Inha | 455/66.1 |

FOREIGN PATENT DOCUMENTS

| | | | |
|---|---|---|---|
| JP | 2001053671 A | | 2/2001 |
| JP | 2001094500 A | | 4/2001 |
| JP | 2005-142940 | * | 11/2003 |
| JP | 2005142940 A | | 6/2005 |

OTHER PUBLICATIONS

Toriatsukai Setsumeisyo Digital Mova N503i HYPER, 4th edition, NTT DoCoMo Group, Jul. 2001, pp. 25, 26, 29, 197, 198.

Japanese Office Action for JP2007-300422 mailed on Nov. 20, 2012.

* cited by examiner

MOBILE TERMINAL, CONTROL METHOD, PROGRAM AND RECORDING MEDIUM

This application is the National Phase of PCT/JP2008/068958, filed Oct. 20, 2008, which is based upon and claims the benefit of priority from Japanese patent application No. 2007-300422 filed on Nov. 20, 2007, the disclosure of which is incorporated herein in its entirety by reference.

TECHNICAL FIELD

The present invention relates to a mobile terminal, a control method, a program and a recording medium.

BACKGROUND ART

Along with the development of functions of mobile phones, there have been cases where, when a function to erase a screen display such as a function to turn off power and a power saving function is performed automatically, a user of a mobile phone recognizes incorrectly that a failure has been occurred, resulting in such as requesting repair. Accordingly, a user interface which is easy to understand for a user was not being provided.

For this reason, users have been informed of the reason or the like of the erasure.

For example, patent citation 1 discloses a mobile communication terminal having: a function to report a low voltage warning before the output voltage of the power supply battery becomes low to a level where stable operation cannot be performed any more, and then turn off the power of the terminal itself; and a battery voltage detection means which detects the output voltage of the power supply battery, which comprises: an operation determination threshold value storage means for setting and memorizing a first operation determination threshold value for determining whether the power of the terminal itself should be turned off or not according to the output voltage of the power supply battery, and a second operation determination threshold value which is higher than the first operation determination threshold value for determining whether the power of the terminal itself should be turned off after reporting operation of a low voltage warning or usual waiting operation should be performed; an operation control means which detects the output voltage of the power supply battery using a battery voltage detection means when a turning-on of the terminal is requested, compares the detected output voltage and each of the operation determination threshold values, and controls operation determined by each of the operation determination threshold values according to the comparison result.

This mobile communication terminal operates as follows.

It is configured to comprise a function to report a low voltage warning before the output voltage of the power supply battery becomes low to a level where stable operation cannot be performed any more, and then turn off the power of the terminal itself, and a battery voltage detection means which detects the output voltage of the power supply battery, which comprises: an operation determination threshold value storage means for setting and memorizing a first operation determination threshold value for determining whether the power of the terminal itself should be turned off or not according to the output voltage of the power supply battery, and a second operation determination threshold value which is higher than the first operation determination threshold value for determining whether the power of the terminal itself should be turned off after reporting operation of a low voltage warning or usual waiting operation should be performed; an operation control means which detects the output voltage of the power supply battery using a battery voltage detection means when a turning-on of the terminal is requested, compares the detected output voltage and each of the operation determination threshold values, and controls operation determined by each of the operation determination threshold values according to the comparison result. Thus, it is possible to report to the user that the power has been turned on when a request for turning on of the power is given by a user after performing power-off following indication of low voltage alarm. Accordingly, complaints such as "Power not turned on" and the like after performing power-off following indication of low voltage alarm and unstable operation in a state of low battery voltage can be avoided.

That is, this mobile communication terminal notifies the user in the event that the power is turned on by the user after the power is turned off according to low voltage detection.

Patent citation 2 discloses a mobile communication apparatus having: an image photographing means; an image display means; a communication means which performs communication including an image between another party's communication device through a wireless line; and a battery which supplies electric power for operation to each of these means, which comprises: a power monitoring means which detects that the battery voltage has declined to a level not more than a predetermined value; and a control means which turns off power supply for at least one of the image photographing means and the image display means, when a battery voltage declining detection notice is received from the power monitoring means in a communicating state including an image with another party's communication device.

This mobile communication apparatus operates as follows.

It is configured to comprise an image photographing means and an image display means, and turns off a power supply to at least one of the image photographing means and the image display means when it is detected that battery voltage has been declined to a level not more than a predetermined value. Thus, a mobile communication apparatus which can save the consumption current of a battery and endure long hours of use as long as possible is realized.

Patent citation 3 discloses a power source switching circuit of a cellular phone operated by a battery having: a main battery which is usually used; a sub battery used as a reserve of the main battery; a voltage monitoring means which monitors an output voltage value of the main battery always, and outputs a switching signal when the output voltage value becomes not more than a predetermined value; and a switching means which supplies power to a logic circuit and a communication circuit from the main battery usually, and switches to power supply from the sub battery when a switching signal is received.

This power source switching circuit of this cellular phone operates as follows.

It is provided a main battery and a sub battery, and when the output voltage value of the main battery which supplies power usually becomes a predetermined value or less, it is changed to power supply from the sub battery. Thus, a charge for the main battery can be performed without suspending the function of the cellular phone.

[Patent citation 1] Japanese Patent Application Laid-Open No. 2001-053671

[Patent citation 2] Japanese Patent Application Laid-Open No. 2001-094500

[Patent citation 3] Japanese Patent Application Laid-Open No. 1993-244733

DISCLOSURE OF INVENTION

Technical Problem

However, none of the invention described in patent citations 1-3 mentioned above advises a user about a charge, that is, connection to an external power supply or exchange with a charged battery.

Accordingly, the object of the present invention is to provide a mobile terminal, a control method, a program and a recording medium which can advise a user about an electric charge or a change to a charged battery.

Technical Solution

An apparatus of the present invention includes: a control means which erases a screen of a display device automatically and indicates the reason of this or, in addition to that, a way of coping to a user; and a detection means which detects a battery exchange or attachment/detachment of an external power supply.

A method of the present invention erases a screen of a display device automatically, indicates the reason of this or, in addition to that, a way of coping to a user, and detects a battery exchange or attachment/detachment of an external power supply.

A program of the present invention is a computer-readable program which makes a computer execute: processing in which a control means erases a screen of a display device automatically, processing in which a display means indicates the reason of this or, in addition to that, a way of coping to a user and processing in which a detection means detects a battery exchange or attachment/detachment of an external power supply.

Advantageous Effects

According to the present invention, a mobile terminal, a control method, a program and a recording medium which can advise a user about a charge or a change to a charged battery can be realized.

BEST MODE FOR CARRYING OUT THE INVENTION

Hereinafter, the present invention will be described in detail using the following examples.

The Embodiment 1

Figure 1:
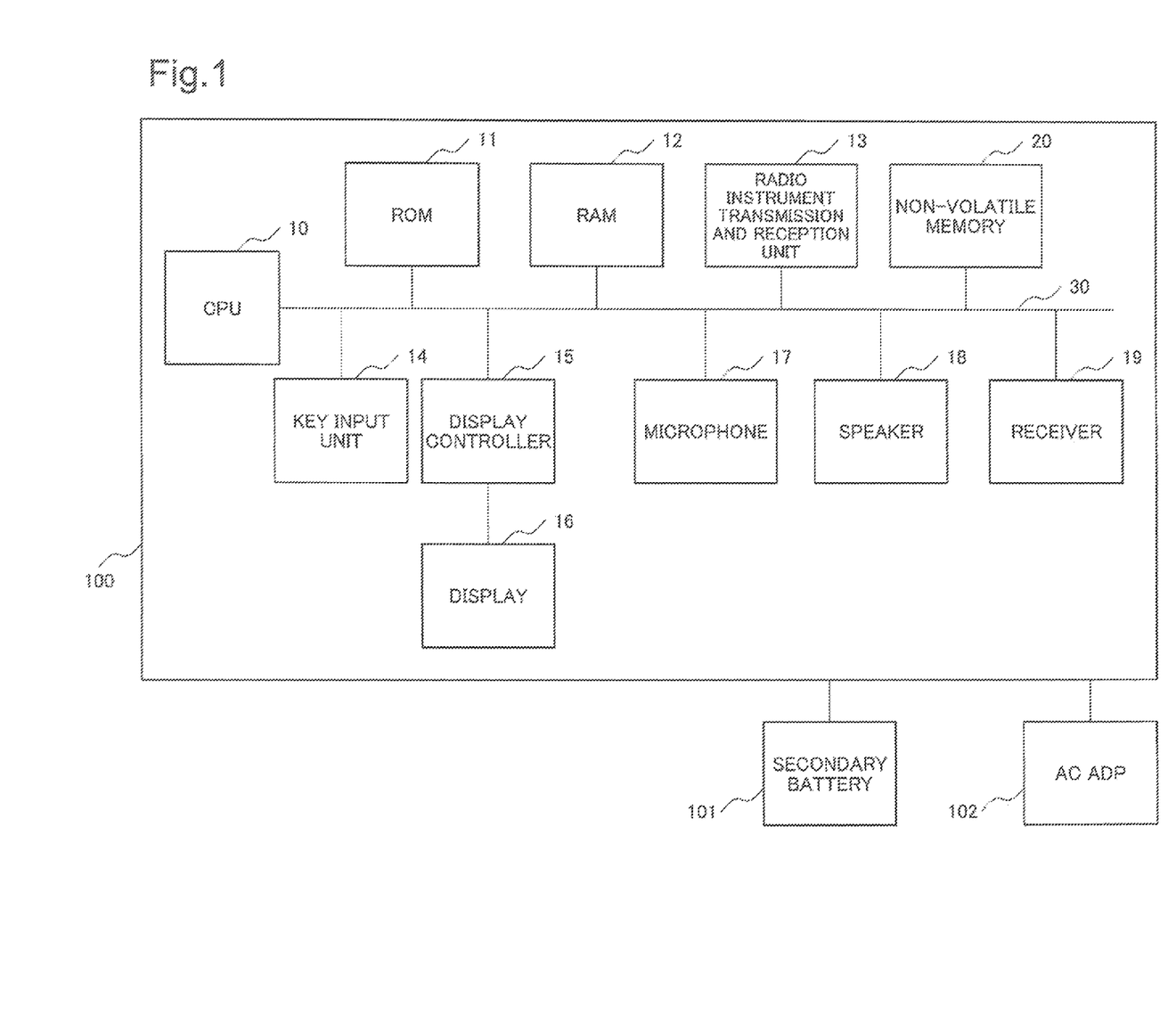
FIG. 1 is a block diagram showing an embodiment of a mobile phone as a mobile terminal according to the present invention

FIG. 1 is a block diagram showing an embodiment of a mobile phone as a mobile terminal of the present invention.

(Structure)

A mobile phone 100 of this exemplary embodiment is equipped with a CPU (Central Processing Unit) 10, which is connected to individual units in the apparatus via a bus 30 and performs overall control.

Among these units, ROM (Read Only Memory) 11 is a memory which stores various control programs to be executed by the CPU 10 such as for low-voltage control and power-saving control and fixed melody data for making a sound of various melodies.

A RAM (Random Access Memory) 12 is used for application for storing data which is inputted by a user and data which is downloaded, and also used as a memory for storing data temporarily when accessing the internet and for storing it for work.

A key input unit 14 is an input circuit which accepts input by various keys (a numeric keypad, function keys, and keys which are arranged in the outer surface when a mobile phone is being folded).

A display controller 15 is a control circuit which controls indication on a display (a liquid crystal display device or an organic EL (Electro Luminescence: luminescence) device) 16, for example.

A microphone 18, a speaker 19 and a receiver 20 are acoustic parts used during call. Sender's voice is inputted in the microphone 18, and voice of a partner speaker is outputted from the speaker 19 or the receiver 20.

A radio instrument transmission and reception unit 13 is a circuit which sends and receives data by wireless.

The above-mentioned mobile phone 100 operates using a secondary battery (a lithium ion battery, a nickel-hydride battery, a Ni—Cd battery or a small size sealed lead battery) 101 as a power supply. In order to charge the secondary battery 101, an AC ADP (Alternating Current Adaptor: AC adapter) 102 is connected. Detection of the secondary battery 101 and attachment/detachment of the secondary battery 101 can be determined by the mobile phone 100. That is, a detection circuit and a non-volatile memory 20 incorporated in the mobile phone 100 detect and record the attachment/detachment of the secondary battery 101.

The non-volatile memory 20 is a semiconductor memory which can perform erasing and writing of data freely, and the content of which does not disappear even if the power is turned off. Telephone book data, various set values, user data and a volume table and the like can be held.

(Operation)

Figure 2:
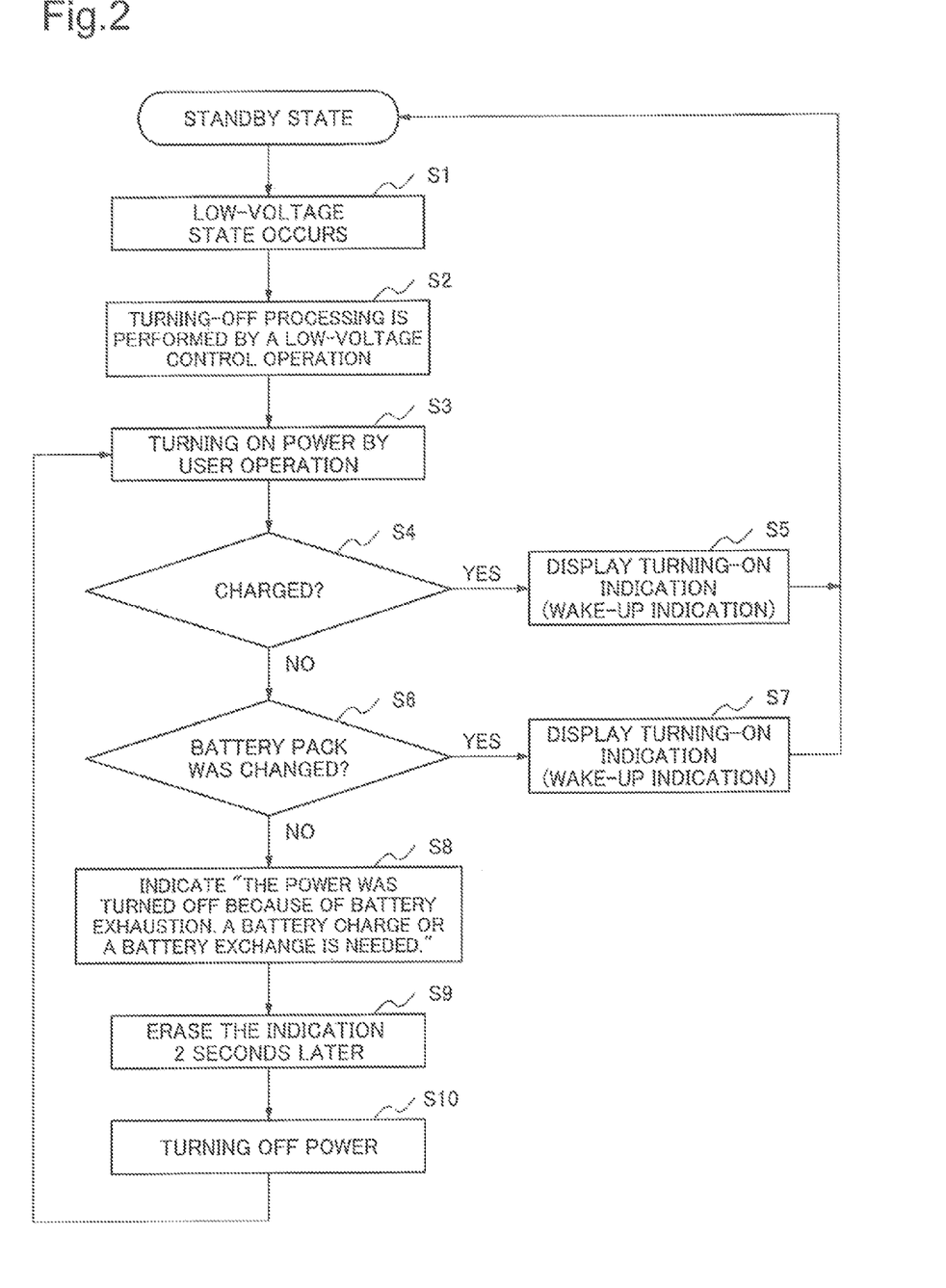
FIG. 2 is a flow chart representing a state of processing about a method for notifying to a user at the time of low-voltage processing occurrence in this embodiment.

FIG. 2 is a flow chart showing the aspect of processing about the method for notifying a user when a low voltage processing occurs in this embodiment.

In a state that a clock and an image which the user likes are indicated on the liquid crystal display of a mobile phone and nothing is operating (hereinafter, referred to as a standby state), a battery voltage declines and a low-voltage state occurs (Step S1).

According to occurring of turning-off processing as a low-voltage control operation by software (Step S2), the power of the above-mentioned mobile phone, is turned off automatically.

At that time, when the user tries to use a mobile phone, turning on operation of the mobile phone is carried out because the power of the mobile phone is being turned off (Step S3).

The mobile phone carries out start processing of the mobile phone according to the above-mentioned user operation. Here, a judgment of whether a charge is performed or not is carried out (Step S4), and when a charge is performed (step S4/YES), turning-on indication is performed (Step S5) and transition to the standby state is conducted.

When it is determined that a charge has not been performed in Step S4 (step S4/NO), a judgment of whether a battery pack has been exchanged or not is performed. Here, about detachment and attachment of a battery pack, it is supposed that it is recorded at the timing of attachment (Step S6).

Here, if a battery has been attached and detached, it is determined that a battery pack has been exchanged (step S6/YES), and turning-on indication is performed (Step S7).

If a battery has not been attached and detached at Step S6, because a flag indicating that a battery has been loaded is not set, it is determined that the battery pack has not been exchanged (step S6/NO). Then, in order to inform the user that the power supply has been turned off because of battery exhaustion and that thus a battery charge or a battery exchange is needed, indication on the liquid crystal display is performed (Step S8).

After the indication in Step S8 (2 seconds later, for example), a screen indicated in Step S8 is erased (Step S9). Here, in order not to make the user recognize falsely that it is possible to use the mobile phone by this battery, turning-off processing is performed (Step S10). Further, even if turning on is performed again by user operation (Step S3), the same processing as the above-mentioned Step S4 and later is repeated.

Figure 3:
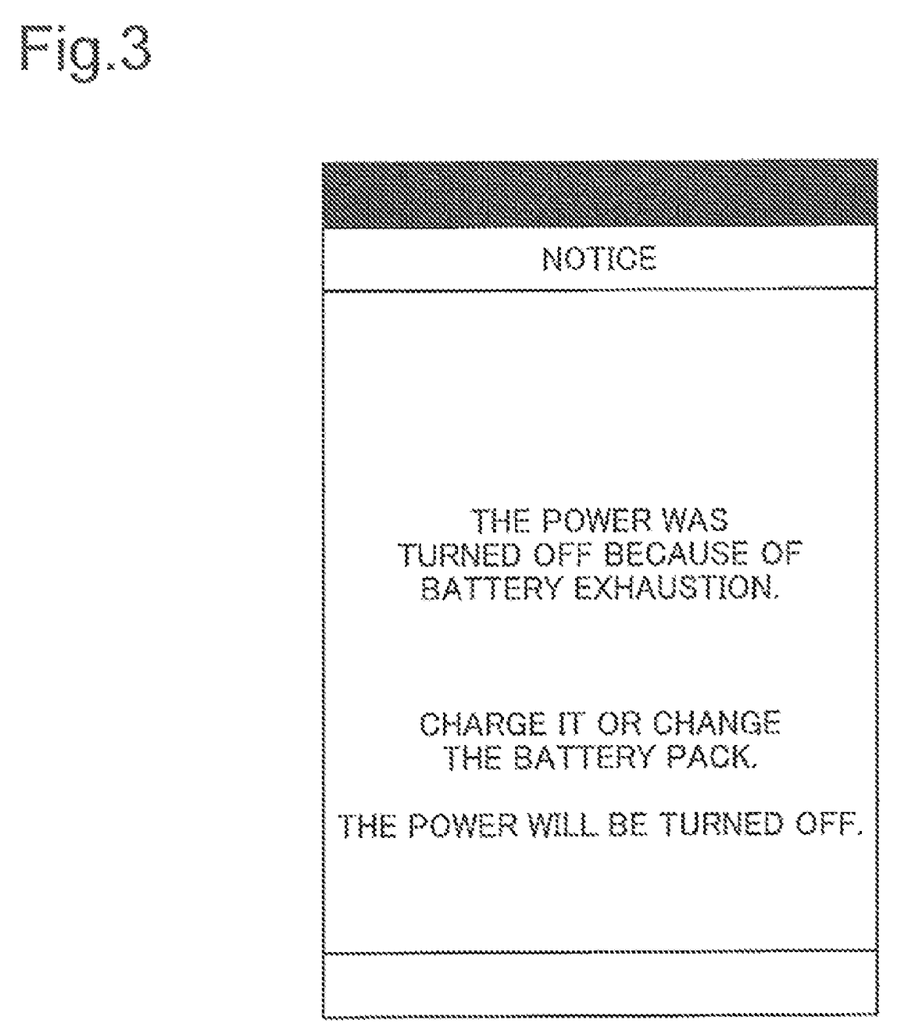
FIG. 3 is a screen display example of Step S8 in FIG. 2.

FIG. 3 indicates a screen display example of Step S8 in FIG. 2.

As shown in FIG. 2 "The power supply was turned off because of battery exhaustion. Charge it or change the battery pack. The power will be turned off." is indicated in a notice field.

The user of a mobile phone can recognize necessity of a charge of the battery of the mobile phone or change of the battery pack, by seeing such indication.

In the above mentioned embodiment, a providing method in the power supply operation at the time of low-voltage detection has been described. There is also an automatic turning-off function of erasing screens as another example of functions performed automatically.

The Embodiment 2

Figure 4:
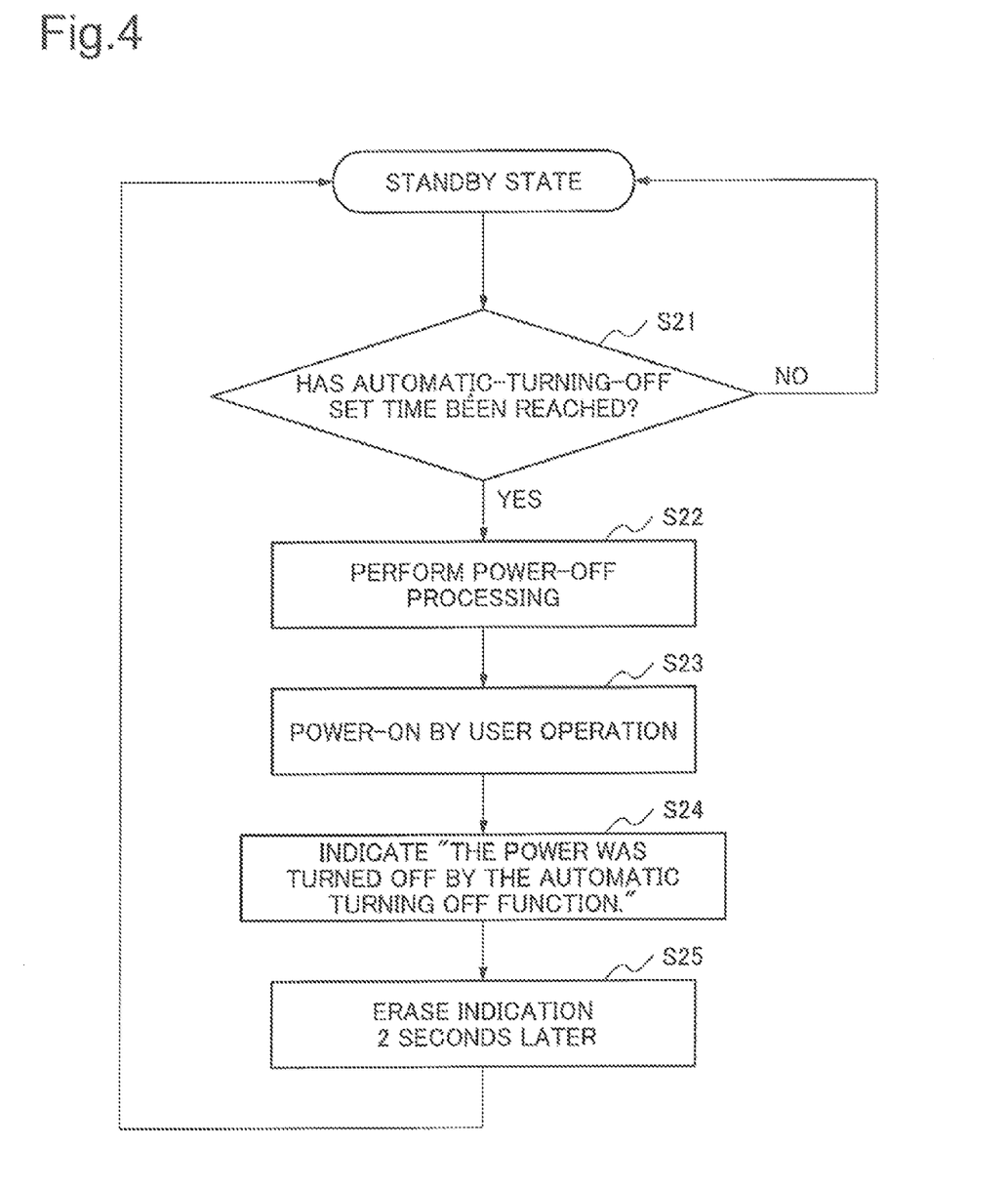
FIG. 4 is a flow chart representing a state of processing about a method for notifying to a user at the time of execution of an automatic turning off function.

FIG. 4 is a flow chart representing the aspect of processing about a method for notifying to a user when an automatic turning-off function is executed.

In the standby state, it is determined whether an automatic-turning-off set time has been reached or not (Step S21).

When it is determined that the automatic-turning-offset time has been reached (step S21/YES), the mobile phone carries out turning-off processing (Step S22). When it is determined that the automatic-turning-off set time has not been reached yet (step S21/NO), the standby state is continued.

In the power-off state, when power turning-on by user operation is performed (Step S23), it is indicated that the power supply has been turned off by the automatic turning off function on the liquid crystal display (Step S24). The display indicates it for a set time of 2 seconds, for example (Step S25), and the process moves to the standby state.

Figure 5:
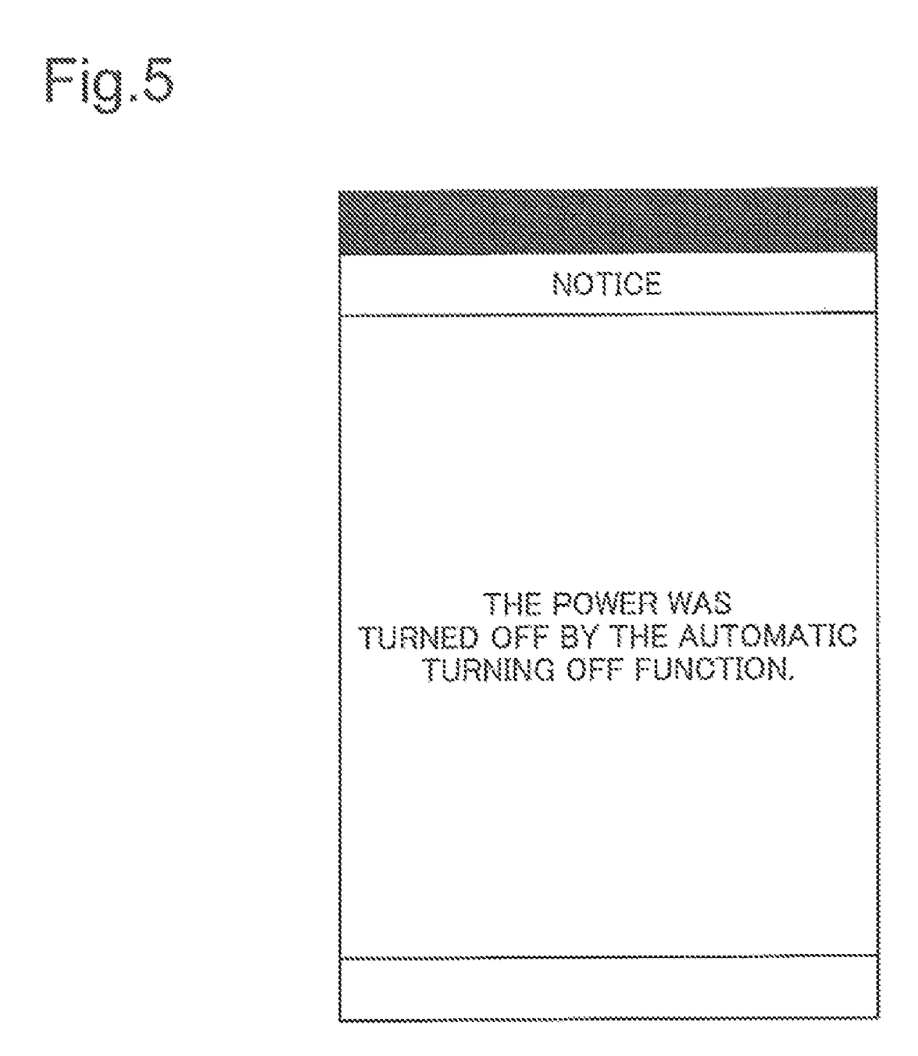
FIG. 5 is a screen display example of Step S24 in the flow chart shown in FIG. 4.

FIG. 5 indicates a screen display example of Step S24 in the flow chart shown in FIG. 4.

In FIG. 5, it is indicated that "The power supply has been turned off by the automatic turning off function." in the notice field.

The user of a mobile phone can recognize that the power supply of the mobile phone has been turned off by the automatic turning off function by seeing such indication.

The Embodiment 3

As another embodiment, there is a case where a screen display and a backlight are turned off by a power saving function.

Figure 6:
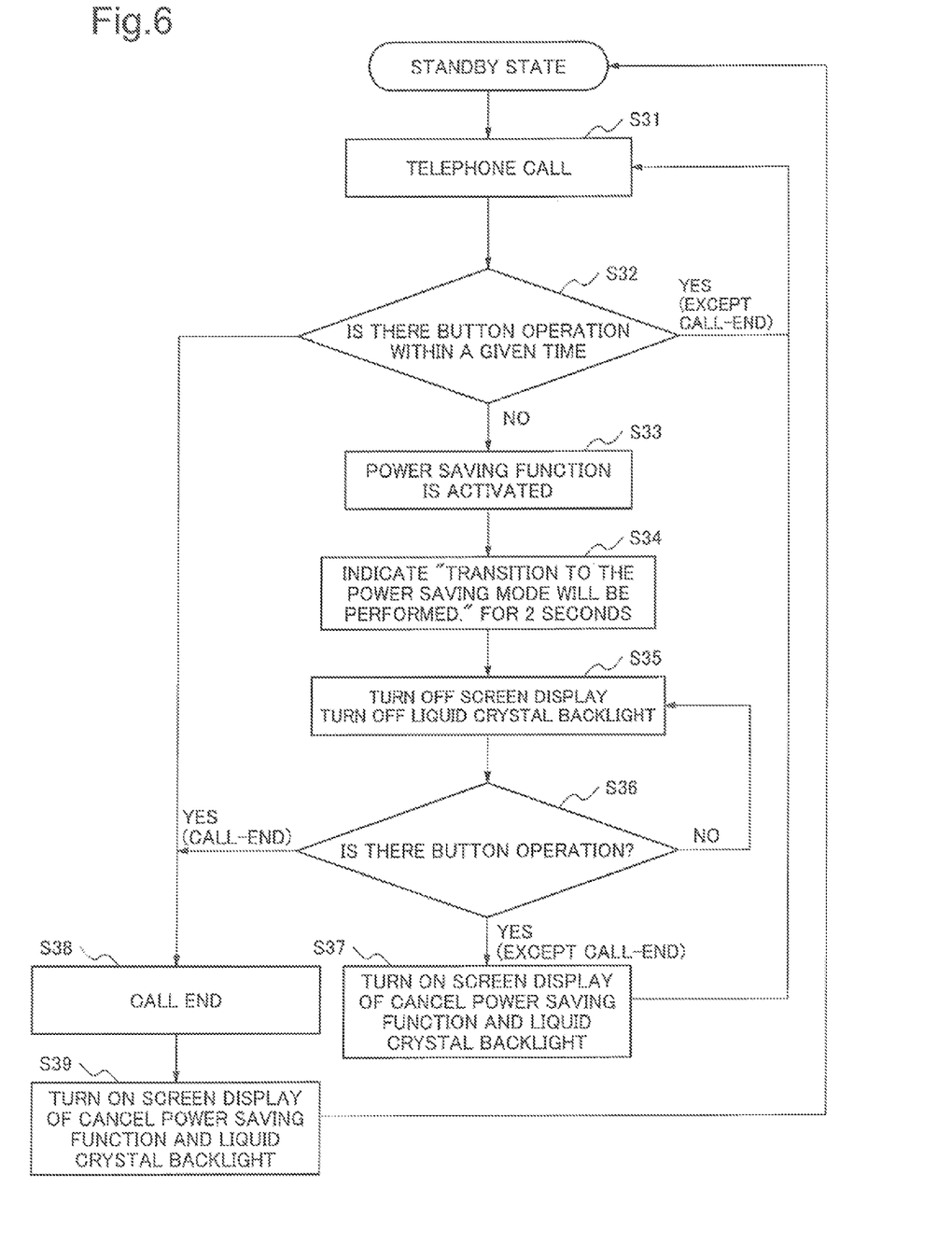
FIG. 6 is a diagram showing a state of processing about a method for notifying to a user when a screen display is turned off by a power saving function.

FIG. 6 shows the state of processing about a method for notifying to the user when turning off a screen display by a power saving function.

The case when a power saving function works during call will be described as an example.

Transition to a call state from a standby state is caused by sending operation or receiving operation (Step S31).

Here, the mobile phone determines whether a button operation is performed within a given time (2 seconds, for example) (Step S32).

In a mobile phone which is controlled so that a power saving function may function, when it is determined that the button operation has not been performed for X seconds (step S32/NO), the mobile phone shifts to a power saving function (Step S33).

When shifting to the power saving function, it is indicated that "The power saving function is going to be actuated." on the liquid crystal display for 2 seconds, for example (Step S34). And after that, a screen display and a backlight of the liquid crystal are turned off as a power saving function (Step S35).

When button operation besides the call-end is performed during call (step S36/YES), the power saving function is canceled, the screen display and the liquid crystal backlight are turned on (Step S37), and the processing is returned to Step S31.

In the case of the button operation in Step S32 and Step S36 is call-end operation, the call-end operation is performed (Step S38), the power saving function is canceled and turn-on operation of a screen display and a liquid crystal backlight is performed (Step S39), and the processing transfers to the standby state.

Figure 7:
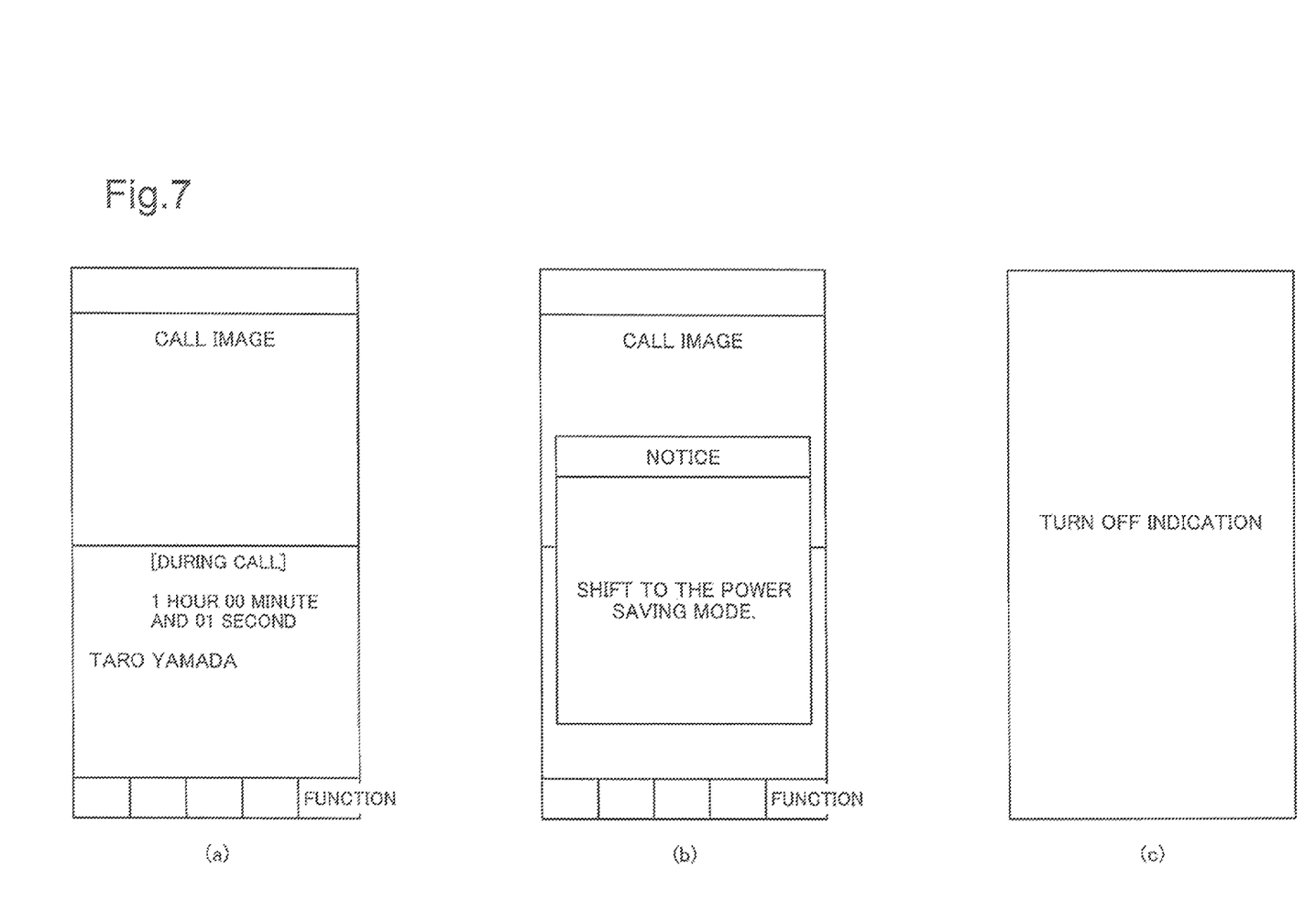

FIGS. 7 (a)-(c) show transition of display examples where a power saving function is actuated during call, and after performing notification to the user, a screen display is turned off.

As shown in FIG. 7 (a), "During call; 1 hour 00 minutes and 01 seconds, Taro Yamada" is indicated in the field of Call Image of the display screen of a mobile phone.

As shown in FIG. 7 (b), "Notice; Transition will be made to the power saving mode." is indicated in the field of Call Image after a predetermined time. As shown in FIG. 7 (c), when 2 seconds, for example, has passed, indication of a display screen of the mobile phone becomes off.

The user of a mobile phone can recognize that display of the mobile phone has been turned off by the power saving mode by seeing such indication.

<Program and Storage Media>

A mobile phone of the exemplary embodiments described above is realized by a program processed in a computer. As a computer, there is a CPU or a microprocessor which is built in a mobile phone, for example, and the CPU or the microprocessor executes a program.

That is, a mobile phone of this exemplary embodiment is a mobile phone which makes, by a program readable by a computer, a computer perform:

(a) processing by which a control means erases a screen of a display device automatically;

(b) processing by which a display means shows the reason or, in addition to that, a way of coping to the user; and (c) processing by which a detection means detects a battery exchange or attachment/detachment of an external power supply.

In addition, the mobile phone may make a computer perform:

(d) processing by which the control means erases the above-mentioned screen according to battery exhaustion or a power saving function.

Further, the mobile phone may make a computer perform:

(e) processing by which the control means turns off the power supply in case of battery exhaustion; and (f) processing by which the display means indicates to the user that the power supply has been turned off because of battery exhaustion and that a charge or exchange of the battery pack is needed.

Yet further, the mobile phone may make a computer perform:

(g) processing of turning off power supply when the control means turns off the power supply according to the automatic turning off function; and (h) processing by which the display means indicates that the power supply is going to be turned off according to the automatic turning off function.

Also, it is possible to make a computer perform, when another function is operating, processing by which the control means turns off the power supply after that function is ended.

The recording medium records one of the above-mentioned programs.

Accordingly, only if there is a computer environment which can execute a program, a mobile terminal of the present invention can be realized anywhere.

Such program may be stored in a computer readable recording medium.

Here, as a recording medium, a computer readable recording medium such as a CD-ROM (Compact Disc Read Only Memory), a flexible disc (FD), a CD-R (CD Recordable) and DVD (Digital Versatile Disk), a semiconductor memory such as a flash memory, RAM (Random Access Memory), ROM (Read Only Memory) and FeRAM (ferroelectric memory) and HDD (Hard Disc Drive) are cited, for example.

A program recorded in these recording media has only to be installed in a ROM of a mobile terminal.

The embodiments mentioned above indicate examples of the preferred embodiment of the present invention, and without limited to them, various modifications and implementation is possible to the present invention within the range that does not depart from the point of the invention. For example, in the above-mentioned description, although a case of turning on a mobile phone by user's operation has been described, it is not limited to this in the present invention.

That is, it may be composed so that, when another function is operating (while writing a mail, call or reading a home page, for example), and even if automatic turning off is being set and the set time has been reached, automatic turning off may not be immediately performed, and the power supply may be turned off after the function is finished (after writing mail, call or reading a home page is finished). In this case, when the power supply is turned on again, the reason of the turning-off will be notified (indicated).

Further, a mobile phone described as a mobile terminal in the above-mentioned embodiment, it can also be applied to a laptop computer or a PDA (Personal Digital Assistant: personal mobile information terminal).

BRIEF DESCRIPTION OF DRAWINGS

FIGS. 7 (a)-(c) are diagrams showing transition of examples of display where a power saving function is activated in the middle of call, and after notification to a user, a screen display is turned off.

EXPLANATION OF REFERENCE

10 CPU
12 RAM
13 Radio instrument transmission and reception unit
14 Key input unit
15 Display controller.
16 Display device
17 Microphone
18 Speaker
19 Receiver
30 Bus line
100 Mobile phone
101 Secondary battery
102 AC ADP

The invention claimed is:

1. A mobile terminal comprising:
a control unit which erases a screen of a display device and displays a reason of the erasing and/or a coping process; and
a detection unit which judges after a detected low-voltage state occurs whether a battery charge is performed or not, when a turning on operation thereof is carried out, and judges whether a battery exchange is performed or not, when the battery charge has not been performed;
wherein the control unit controls the display device of the mobile terminal to display a turning-on indication when the battery charge is performed and when the battery exchange is performed;
wherein the control unit erases the screen of the display device and displays the reason of the erasing and/or coping process when the battery exchange has not been performed, and
wherein the display of the reason of the erasing and/or coping process is deleted after a predetermined of time period and the control unit turns off power of the mobile terminal.

2. The mobile terminal according to claim 1, wherein the control unit erases the screen according to battery exhaustion or a power saving function.

3. The mobile terminal according to claim 2, wherein, the control unit turns off power according to the battery exhaustion, and indicates that the power has been turned off according to the battery exhaustion and that a charge or a battery pack exchange is being advised.

4. The mobile terminal according to claim 2, wherein, the control unit turns off the power according to an automatic turning off function, and indicates that the power is going to be turned off according to the automatic turning off function.

5. The mobile terminal according to claim 4, wherein the control unit turns off the power after completion of another function, if the another function is being operated.

6. The mobile terminal according to claim 1, wherein, the control unit indicates a reason of the last turning-off when the power is turned on again after being turned off.

7. A control method of a mobile terminal for notifying a user when a low voltage processing occurs, the method comprising:

erasing, by a control unit of the mobile terminal, a screen of a display device;

showing a reason of the erasing and/or a coping process to the user;

judging, by a detection unit of the mobile terminal after a detected low-voltage state occurs, whether a battery charge is performed or not, when a turning on operation of the mobile terminal is carried out; and judging whether a battery exchanged is performed or not, when the battery charge has not been performed;

wherein the control unit controls the display device of the mobile terminal to display a turning-on indication when the battery charge is performed and when the battery exchange is performed;

wherein the control unit erases the screen of the display device and displays the reason of the erasing and/or coping process when the battery exchange has not been performed, and wherein the display of the reason of the erasing and/or coping process is deleted after a predetermined of time period and the control unit turns off power of the mobile terminal.

8. The control method of a mobile terminal according to claim 7, wherein the screen is erased according to battery exhaustion or a power saving function.

9. The control method of a mobile terminal according to claim 8, further comprising:

turning off the power according to the battery exhaustion; and indicating to the user that the power has been turned off because of the battery exhaustion and that a charge or a battery pack exchange is being advised.

10. The control method of a mobile terminal according to claim 8, further comprising:

turning off the power according to an automatic turning off function; and, indicating that the power is going to be turned off according to the automatic turning off function.

11. The control method of a mobile terminal according to claim 10, further comprising:

turning off the power after completion of another function if the another function is being operated.

12. The control method of a mobile terminal according to claim 7, further comprising:

indicating a reason of the last turning-off when the power is turned on again after being turned off.

13. A non-transitory computer-readable storage medium which stores a program, wherein the program making the computer of a mobile terminal perform:

processing by which a control unit erases a screen of a display device;

processing by which a display unit indicates a reason of the erasing and/or a coping process to a user; and processing by which a detection unit judges after a detected low-voltage occurs whether a battery charge is performed or not, when a turning on operation is carried out, and judges whether a battery exchange is performed or not, when the battery charge has not been performed;

wherein the control unit controls the display device of the mobile terminal to display a turning-on indication when the battery charge is performed and when the battery exchange is performed;

wherein the control unit erases the screen of the display device and displays the reason of the erasing and/or coping process when the battery exchange has not been performed, and wherein the display of the reason of the erasing and/or coping process is deleted after a predetermined of time period and the control unit turns off power of the mobile terminal.

14. The non-transitory computer-readable storage medium according to claim 13, wherein the program makes the computer perform processing by which the control unit erases the screen according to battery exhaustion or a power saving function.

15. The non-transitory computer-readable storage medium according to claim 14, wherein the program further makes the computer perform:

processing by which the control unit turns off a power supply according to the battery exhaustion; and processing by which the display unit indicates to the user that the power has been turned off because of the battery exhaustion and that a charge or a battery pack exchange is being advised.

16. The non-transitory computer-readable storage medium according to claim 14, wherein the program further makes the computer perform:

processing by which the control unit turns off the power according to an automatic turning off function; and processing by which the display unit indicates that the power is going to be turned off according to the automatic turning off function.

17. The non-transitory computer-readable storage medium according to claim 14, wherein the program further makes the computer perform:

processing by which the control unit turns off the power after completion of another function if the another function is being operated.

* * * * *